(12) United States Patent
Bridenbaugh et al.

(10) Patent No.: US 11,766,919 B2
(45) Date of Patent: Sep. 26, 2023

(54) SYSTEM AND METHOD OF CLIMATE CONTROL IN UNMANNED MACHINE

(71) Applicant: Caterpillar Inc., Peoria, IL (US)

(72) Inventors: Michael W. Bridenbaugh, Sewickley, PA (US); Brad R. Van De Veer, Washington, IL (US); Erick A. Njos, Sahuarita, AZ (US)

(73) Assignee: Caterpillar Inc., Peoria, IL (US)

( * ) Notice: Subject to any disclaimer, the term of this patent is extended or adjusted under 35 U.S.C. 154(b) by 177 days.

(21) Appl. No.: 17/160,651

(22) Filed: Jan. 28, 2021

(65) Prior Publication Data

US 2022/0234419 A1 Jul. 28, 2022

(51) Int. Cl.
*B60H 1/00* (2006.01)

(52) U.S. Cl.
CPC ..... *B60H 1/00878* (2013.01); *B60H 1/00007* (2013.01); *B60H 1/00378* (2013.01)

(58) Field of Classification Search
CPC ............ B60H 1/00878; B60H 1/00007; B60H 1/00378; B60H 2001/00733; B60H 1/00735; B60H 1/00821
See application file for complete search history.

(56) References Cited

U.S. PATENT DOCUMENTS

| | | | | |
|---|---|---|---|---|
| 6,173,902 B1* | 1/2001 | Bauer | ................. | B60H 1/00864 236/91 C |
| 6,304,803 B1* | 10/2001 | Dao | ................... | B60H 1/00971 165/265 |
| 6,345,767 B1* | 2/2002 | Burrus, IV | ......... | B60H 1/00735 236/1 R |
| 6,431,592 B2* | 8/2002 | Seip | .................. | B60R 21/01526 280/730.2 |
| 6,622,502 B2* | 9/2003 | Yeo | ...................... | B60H 1/3205 62/229 |
| 6,745,582 B1* | 6/2004 | Urbank | .............. | B60H 1/00792 62/133 |
| 6,792,339 B2* | 9/2004 | Basson | ............ | G08B 13/19656 701/28 |
| 6,885,285 B2 | 4/2005 | Losey | | |
| 6,922,622 B2* | 7/2005 | Dulin | .............. | B60W 30/18054 701/45 |
| 6,930,614 B2* | 8/2005 | Rackham | ............ | B60R 25/1004 340/425.5 |

(Continued)

FOREIGN PATENT DOCUMENTS

AU 2016236831 A1 * 10/2017 ......... B60H 1/00742
CN 109130781 A 1/2019
(Continued)

*Primary Examiner* — Ljiljana V. Ciric

(57) ABSTRACT

A system for controlling the climate of a cab of an autonomously operable machine when operated unmanned, and related machine. The system includes at least one temperature sensor to generate a signal indicative of the temperature within the cab and a controller configured to receive the signal as well as determine if the machine is being operated unmanned. If the machine is being operated unmanned, the controller is further configured to generate machine control commands to turn on the cab cooling device or cab heating device and adjust a blower as needed to maintain the cab temperature above the minimum and/or below the maximum temperature thresholds.

10 Claims, 4 Drawing Sheets

(56) References Cited

U.S. PATENT DOCUMENTS

| | | | |
|---|---|---|---|
| 7,419,027 B2* | 9/2008 | Bihya | B60R 21/01556 180/271 |
| 8,633,424 B2* | 1/2014 | Chernyavsky | B60H 1/12 219/202 |
| 8,836,491 B2* | 9/2014 | Rao | B60H 1/00978 340/426.26 |
| 8,966,918 B2* | 3/2015 | Kitaoka | B60H 1/32 62/181 |
| 9,041,523 B1* | 5/2015 | Birdis | B60N 2/002 340/457 |
| 9,196,146 B1* | 11/2015 | Vicente | G08B 21/14 |
| 9,227,484 B1* | 1/2016 | Justice | B60H 1/00778 |
| 9,381,855 B1* | 7/2016 | Arnold | G08B 21/22 |
| 9,381,856 B1* | 7/2016 | Arnold | B60N 2/002 |
| 9,384,647 B1* | 7/2016 | Arnold | G01K 1/14 |
| 9,487,063 B2* | 11/2016 | Zeigler | B60H 1/3226 |
| 9,589,455 B2 | 3/2017 | Nakagawa | |
| 9,682,609 B1 | 6/2017 | Dudar | |
| 9,734,695 B2* | 8/2017 | Henry | G08B 6/00 |
| 10,011,156 B2 | 7/2018 | Lee et al. | |
| 10,124,649 B2* | 11/2018 | Patel | B60H 1/00964 |
| 10,189,332 B2* | 1/2019 | Miyakoshi | B60H 1/00007 |
| 10,276,187 B2* | 4/2019 | Gross | G08B 21/22 |
| 10,293,661 B2* | 5/2019 | Miyakoshi | B60L 58/12 |
| 10,332,065 B2* | 6/2019 | Ferguson | G01C 21/3453 |
| 10,377,205 B2* | 8/2019 | Pursifull | B60H 1/0075 |
| 10,556,481 B2* | 2/2020 | Zhou | B60H 1/00964 |
| 10,589,593 B2* | 3/2020 | Westendarp | B60H 1/00542 |
| 10,603,983 B2 | 3/2020 | Brooks et al. | |
| 10,744,842 B2* | 8/2020 | Wakisaka | B60H 1/00785 |
| 10,773,570 B2* | 9/2020 | Herbolzheimer | B60H 1/3213 |
| 10,933,715 B2* | 3/2021 | Pihl | B60H 1/00378 |
| 11,059,348 B2* | 7/2021 | Yu | B60H 1/00 |
| 11,179,997 B2* | 11/2021 | Zhang | B60H 1/0073 |
| 11,453,363 B2* | 9/2022 | Pupillo | B60Q 1/50 |
| 11,482,019 B2* | 10/2022 | Porta | G06V 40/20 |
| 2002/0145516 A1* | 10/2002 | Moskowitz | B60H 1/008 340/541 |
| 2002/0163426 A1* | 11/2002 | Moskowitz | B60R 99/00 340/988 |
| 2003/0158644 A1* | 8/2003 | Basson | G08B 13/19647 701/49 |
| 2003/0222775 A1* | 12/2003 | Rackham | G08B 21/0202 340/457 |
| 2005/0178132 A1* | 8/2005 | Sakaguchi | F25B 49/027 62/181 |
| 2006/0033613 A1* | 2/2006 | Reece | B60Q 1/52 340/457 |
| 2006/0062678 A1* | 3/2006 | Furuta | E02F 9/24 417/42 |
| 2007/0046451 A1* | 3/2007 | Bihya | G08B 21/22 180/271 |
| 2008/0004774 A1* | 1/2008 | Wieczorek | B60R 21/00 701/45 |
| 2008/0022704 A1* | 1/2008 | Fukuta | F24F 11/63 62/244 |
| 2008/0157985 A1* | 7/2008 | Wilson | B60N 2/28 340/584 |
| 2009/0204297 A1* | 8/2009 | Friedman | B60H 1/00742 701/46 |
| 2009/0217655 A1* | 9/2009 | Yabuki | F01P 7/044 123/563 |
| 2011/0267186 A1* | 11/2011 | Rao | B60H 1/00978 348/E5.09 |
| 2015/0191073 A1* | 7/2015 | Bjorkerud | B60H 1/00828 454/75 |
| 2016/0103111 A1* | 4/2016 | Griffin | B60N 2/002 73/25.01 |
| 2016/0200169 A1* | 7/2016 | Tjahjono | G01J 5/025 701/45 |
| 2016/0272114 A1* | 9/2016 | Medina | E05F 15/71 |
| 2016/0288621 A1* | 10/2016 | Sakane | B60H 1/2218 |
| 2017/0046937 A1* | 2/2017 | Chacon, Jr. | G08B 21/18 |
| 2017/0144510 A1* | 5/2017 | Zeigler | B60H 1/00428 |
| 2017/0349027 A1 | 12/2017 | Goldman-Shenhar et al. | |
| 2018/0086181 A1* | 3/2018 | Connell | B60H 1/00985 |
| 2018/0251122 A1* | 9/2018 | Golston | B60W 50/0098 |
| 2018/0370431 A1* | 12/2018 | Wincek | B60H 1/00757 |
| 2019/0126934 A1 | 5/2019 | Wellborn et al. | |
| 2019/0259410 A1* | 8/2019 | Gross | G08B 21/24 |
| 2020/0148028 A1* | 5/2020 | Westendarp | B60H 1/00985 |
| 2021/0008959 A1* | 1/2021 | Lee | B60H 1/00978 |
| 2021/0107334 A1* | 4/2021 | Shtrom | B60H 1/0073 |
| 2021/0402922 A1* | 12/2021 | Wincek | B60Q 9/00 |
| 2022/0234419 A1* | 7/2022 | Bridenbaugh | B60H 1/00007 |
| 2022/0371400 A1* | 11/2022 | Jaglan | B60H 1/00828 |
| 2022/0402331 A1* | 12/2022 | Tada | H01M 10/625 |
| 2023/0063435 A1* | 3/2023 | Chewter | B60H 1/00742 |

FOREIGN PATENT DOCUMENTS

| | | | | |
|---|---|---|---|---|
| DE | 102019125825 A1 * | 3/2021 | | B60H 1/005 |
| EP | 1145882 A2 * | 10/2001 | | B60H 1/00735 |
| EP | 2090447 A3 * | 11/2009 | | B60H 1/00642 |
| EP | 2703199 A1 * | 3/2014 | | B60H 1/00378 |
| EP | 2703199 B1 * | 11/2018 | | B60H 1/00378 |
| EP | 3307572 B1 * | 2/2021 | | B60H 1/00642 |
| GB | 2588286 A * | 4/2021 | | B60H 1/00271 |
| GB | 2606678 A * | 11/2022 | | B60H 1/00271 |
| JP | 2019-156216 A | 9/2019 | | |
| WO | WO-2004001695 A1 * | 12/2003 | | B60Q 1/52 |
| WO | WO-2013155661 A1 * | 10/2013 | | B60H 1/00742 |
| WO | WO-2016149746 A1 * | 9/2016 | | B60H 1/00742 |
| WO | WO-2016182962 A1 * | 11/2016 | | B60H 1/00742 |
| WO | WO 2019/117878 A1 | 6/2019 | | |
| WO | WO-2020094998 A1 * | 5/2020 | | B60H 1/0073 |

* cited by examiner

SYSTEM AND METHOD OF CLIMATE CONTROL IN UNMANNED MACHINE

TECHNICAL FIELD

This patent disclosure relates generally to the cab of an autonomously-operated machine, and, more particularly, to a method and system for climate control in the cab of a machine when operated autonomously.

BACKGROUND

Machines such as dozers, motor graders, wheel loaders, etc., are used to perform a variety of tasks, such as road clearing, digging, loosening, carrying, etc. The machines may operate in an autonomous, semi-autonomous, or manual manner to perform these tasks in response to commands generated as part of a work plan for the machines. Autonomously operated and semi-autonomously operated machines may offer certain advantages over manually operated machines. For example, autonomous systems may permit operation in environments that are unsuitable or undesirable for a human operator inasmuch as machines may be controlled from a remote location. Autonomous or semi-autonomous systems may also compensate for inexperienced human operators as well as inefficiencies associated with repetitive tasks.

Remote control and automation allow such equipment to complete work without an operator in the cab of the machine. Often times in these unmanned operation scenarios, the remote operator does not consider the cab climate control settings. Cab cleanliness and components may suffer as a result of this. It is important to keep cabs pressurized to reduce dust ingress by keeping the HVAC blower on at all times. It is also beneficial to keep the cab temperature in a safe range for the life of the internal components.

U.S. Pat. No. 10,603,983 B2 to Brooks et al. discloses a system wherein pressure sensors are provided inside and outside of the cab of an agriculture tractor, and a cab sensor is provided to sense an open or closed state of the operator cab. A controller is configured to activate/deactivate an airflow system in the cab based upon the pressure sensors and cab sensor. The controller can activate the airflow system to provide a positive pressure differential in the operator cab to provide desirable conditions for the operator when the cab is in a closed state. Conversely, the controller can deactivate the airflow system when the cab is in an open state in order to maximize the life of the system.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

The disclosure is directed to a method for controlling climate of a cab of a machine when operated unmanned. The method includes turning on a blower servicing the cab to a minimum setting, detecting a temperature within the cab via a temperature sensor, and comparing a detected temperature to at least one of a maximum temperature threshold and a minimum temperature threshold. The method further includes at least one of turning on cab cooling device and adjusting the blower to maintain the temperature within the cab below said maximum temperature threshold if the detected temperature is greater than said maximum temperature threshold, and turning on a cab heating device and adjusting the blower to maintain the temperature within the cab above said minimum temperature threshold if the detected temperature is less than said minimum temperature threshold.

The disclosure also is directed to a system for controlling climate of a cab of a machine when operated unmanned. The system includes at least one temperature sensor disposed and adapted to generate a signal indicative of a temperature within the cab, and a controller. The controller is configured to receive the signal indicative of the temperature within the cab, and determine if the machine is being operated unmanned. If the machine is being operated unmanned, then the controller is further configured to turn on a blower servicing the cab to a minimum setting, and at least one of compare the signal indicative of the temperature within the cab to a maximum temperature threshold or a minimum temperature threshold. If the signal indicative of the temperature within the cab is greater than the maximum temperature threshold, the controller is configured to generate machine control commands to turn on cab cooling device, and generate machine control commands to adjust the blower as needed to maintain a temperature within the cab below the maximum temperature threshold. If the signal indicative of the temperature within the cab is less than the minimum temperature threshold, the controller is configured to generate machine control commands to turn on cab heating device, and generate machine control commands to adjust the blower as needed to maintain a temperature within the cab above the minimum temperature threshold.

The disclosure also relates to a machine including a cab, a blower disposed and adapted to provide air to the cab, at least one temperature sensor disposed and adapted to generate a temperature signal indicative of a temperature within the cab, a controller, and at least one of a cab heating device disposed and adapted to heat air provided to the cab by the blower and a cab cooling device disposed and adapted to cool air provided to the cab by the blower. The controller is configured to receive the signal indicative of the temperature within the cab, determine if the machine is being operated unmanned, and if the machine is being operated unmanned, then turn on the blower servicing the cab to a minimum setting, and compare the signal indicative of the temperature within the cab to at least one of a maximum temperature threshold and a minimum temperature threshold. If the signal indicative of the temperature within the cab is greater than the maximum temperature threshold, then the controller is configured to generate machine control commands to turn on cab cooling device, and generate machine control commands to adjust the blower as needed to maintain a temperature within the cab below the maximum temperature threshold. If the signal indicative of the temperature within the cab is less than the minimum temperature threshold, then the controller is configured to generate machine control commands to turn on cab heating device, and generate machine control commands to adjust the blower as needed to maintain a temperature within the cab above the minimum temperature threshold.

BRIEF DESCRIPTION OF THE DRAWING(S)

DETAILED DESCRIPTION

Figure 1:
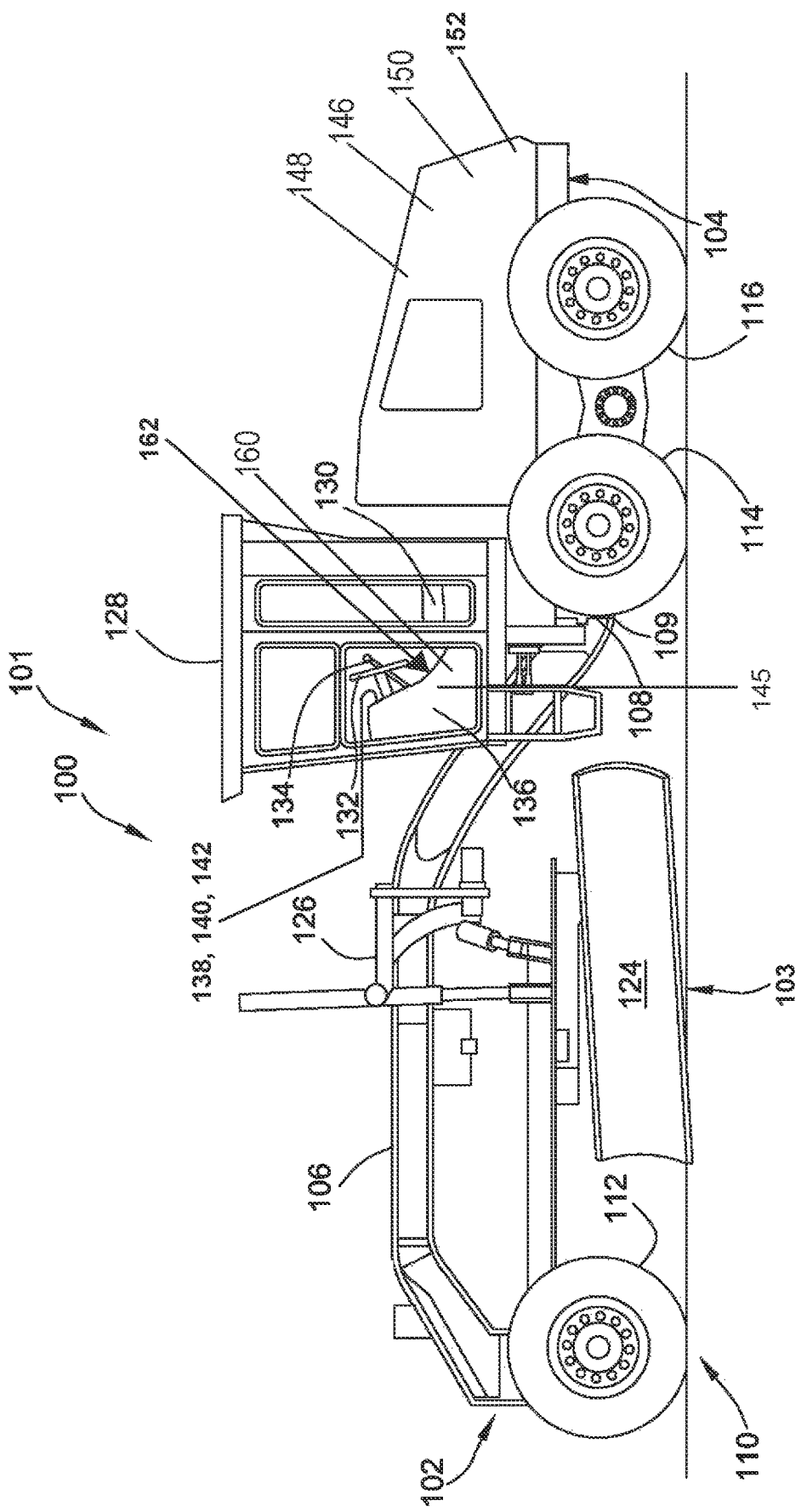
FIG. 1 is a side elevational view of an exemplary machine incorporating a control arrangement according to aspects of this disclosure.

Turning now to the drawings, an embodiment of an exemplary machine 100 in the form of a motor grader 101 is illustrated in FIG. 1. The machine 100 is may be remotely controlled for autonomous or semiautonomous operation, partially or entirely controlled by a control system that does not require operation by an on-board human operator.

It will be appreciated that, although a motor grader 101 is illustrated in FIG. 1, the term "machine" may refer to any machine that may be configured to operate in an autonomous manner to perform some type of operation. For example, a machine 100 may alternatively be a bulldozer, hauling vehicle, front-end loader, harvesting equipment, snow blower, or the like.

The motor grader 101 includes a main frame 102 supporting a ground-engaging work implement 103. Although an exemplary blade 124 is illustrated as the attached implement, the motor grader 101 may include an additional implement such as, for example, plows, scarifiers, and rippers. The main frame 102 has a rear frame portion 104 and a front frame portion 106. The rear and front frame portions 104, 106 may optionally be articulated at an articulated joint 108, which includes a hinge 109. The main frame 102 is supported on a plurality of ground engaging members 110. In the illustrated embodiment, the ground engaging members 110 include a pair of front wheels 112, which are spaced from a plurality of rear wheels 114, 116, which are disposed pairs along opposite sides of the rear frame portion 104. It will be appreciated, however, that the ground engaging members 110 may include alternate arrangements, such as, for example, the rear wheels 114, 116 may alternately be track assemblies, as are known in the art.

An operator cab 128 may be supported along the front frame section 120. The cab 128 includes a climate controls 138, including temperature and blower controls 140, 142 for operator control of a cab heating device 141, cab cooling device 142, and blower 145 servicing the cab 128. The cab cooling device 142 may be any appropriate arrangement, such as an air conditioning system, an outdoor air mixing arrangement, a combination of the same, or another appropriate arrangement known in the art. Similarly, the cab heating device 141 may be a heater, an electric heating element, a coolant diverter arrangement, such as those including a diverter valve, or another appropriate arrangement known in the art. The cab 128 may also include, for example, a seat 130, a console 136, and a variety of operator controls, such as a steering mechanism 132, a speed-throttle or control lever 134. An operator occupying the cab 128 can control the various functions and motion of the motor grader 101, for example, by using the steering mechanism 132 to set a direction of travel for the motor grader 101 or by using the control lever 134 to set the travel speed of the machine. As can be appreciated, the representations of the various control mechanisms presented herein are generic and are meant to encompass all possible mechanisms or devices used to convey an operator's commands to a machine, including, for example, so-called joystick operation.

The machine 100 includes a prime mover 146, which may be of any appropriate design. For example, the prime mover 146 may include an engine 148 adapted to propel the machine 100 through operation of the ground engaging members 110. The prime mover 146 may further be coupled to a hydraulic system 150. The hydraulic system 150 may include one or more pumps (not visible) to drive or power machine operation such as, for example, steering of ground engaging members 110, such as wheels 114, 116, and operation of a linkage assembly 126 to control the position of the blade 124 relative to the frame 102. In at least one embodiment, the prime mover 146 includes one or more batteries 152, the machine 100 being hybrid or electronically operated.

A control module or electronic controller 160 is connected to the machine 100 and arranged to receive information from various sensors on the machine 100, process that information, and issue commands to various components within the system during operation. While the electronic controller 160 may be located remotely, in at least one embodiment, the electronic controller 160 may be disposed on the machine 100.

The electronic controller 160 may be of any conventional design having hardware and software configured to perform the calculations and send and receive appropriate signals to perform the disclosed logic. The controller 160 may include one or more controller units, and may be configured solely to perform the disclosed strategy, or to perform the disclosed strategy and other independent processes of the machine 100. The electronic controller 160 be of any suitable construction, and may include a processor (not shown) and a memory component (not shown). The processor may be microprocessors or other processors as known in the art. In some embodiments, the processor may be made up of multiple processors. In one example, the controller 160 comprises a digital processor system including a microprocessor circuit having data inputs and control outputs, operating in accordance with computer-readable instructions stored on a computer-readable medium. Typically, the processor will have associated therewith long-term (non-volatile) memory for storing the program instructions, as well as short-term (volatile) memory for storing operands and results during (or resulting from) processing.

The processor may execute instructions for operation of various systems of the machine 100. In alternative embodiments, hard-wired circuitry may be used in place of or in combination with software instructions to implement desired operation. Such instructions may be read into or incorporated into a computer readable medium, such as the memory component or provided external to processor. The memory component may include any form of computer-readable media as described above. The memory component may include multiple memory components. Thus, embodiments are not limited to any specific combination of hardware circuitry and software.

The term "computer-readable medium" as used herein refers to any medium or combination of media that participates in providing instructions to processor for execution. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer or processor can read.

Figure 2:
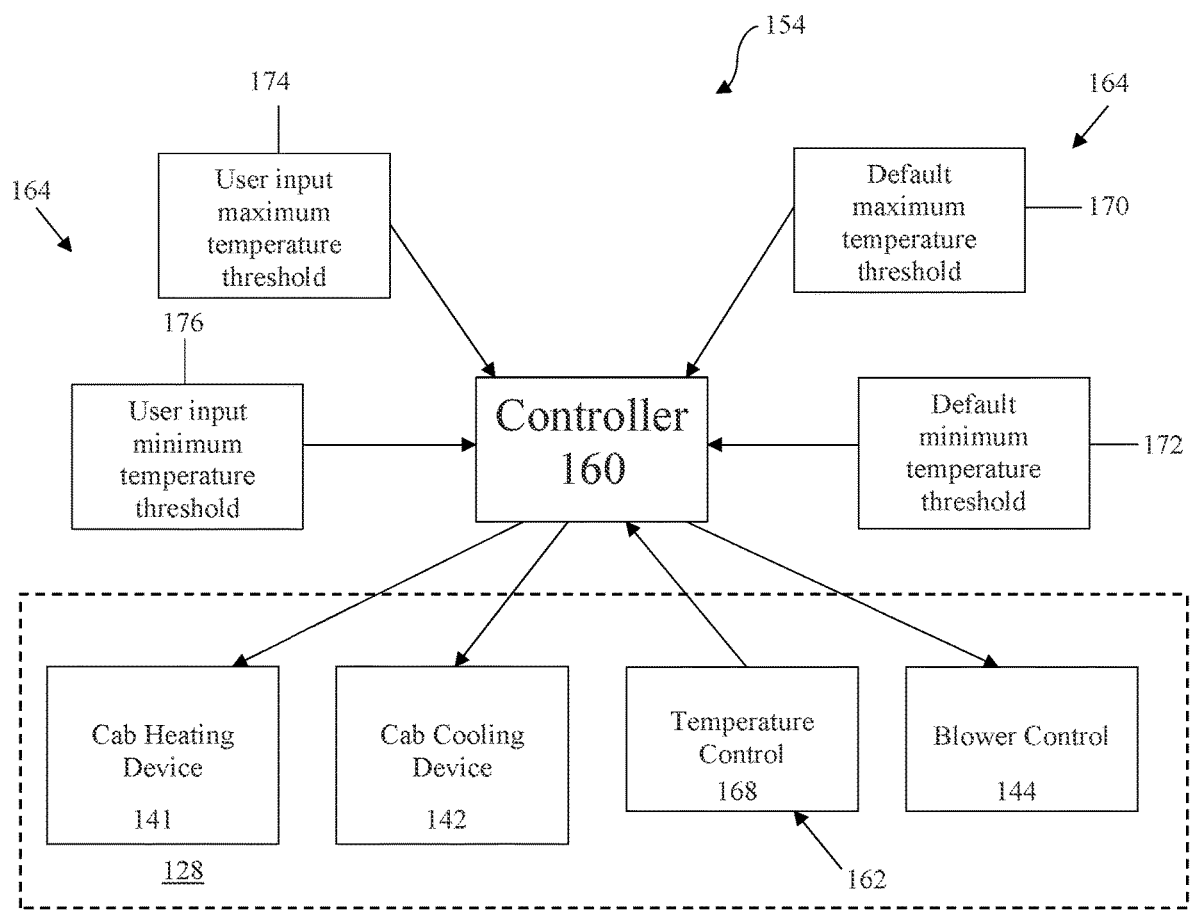
FIG. 2 is a schematic diagram of a system incorporating aspects of the control arrangement of this disclosure.

Referring to FIG. 2, there is illustrated an exemplary controller-implemented system and method according to the present disclosure. The controller 160 may be connected to receive signals from a plurality of sensors (shown generally as 162 in FIG. 1) and control inputs (shown generally as 164). While this disclosure is directed to a climate control system 154 for control of the climate within the cab 128 during unmanned operation, those of skill in the art will appreciate that the controller 160 may receive signals from sensors 162 and control inputs 164 not associated with the climate control system 154.

The climate control system 154 includes at least one temperature sensor 168 is disposed to sense a temperature associated with the cab 128. The at least one temperature sensor 168 may be disposed, for example, within or adjacent to the cab 128 or a structure associated with the cab 128, so long as the at least one temperature sensor 168 is representative of the temperature within the cab 128. The at least one temperature sensor 168 provides a temperature signal that is indicative of the temperature within the cab 128 to the controller 160.

According to this disclosure, a plurality of control inputs 164 are provided for use in operating the climate controls 138 associated with the cab 128 when the machine 100 is operating in an unmanned mode. A control signal from a control input 164 relayed to the controller 160 may be used in a calculation, along with other parameters, to yield a desired operation of the machine 100. According to the climate control system 154, control inputs 164 to the controller 160 include at least a default maximum temperature threshold 170 and a default minimum temperature threshold 172. The default maximum and minimum temperature thresholds 170, 172 may define the maximum and minimum temperatures for maintaining the cab 128 during unmanned operation of the machine 100. That is, when a temperature indicated by the signal indicative the temperature within the cab 128 exceeds the default maximum temperature threshold 170 or is less than the default minimum temperature threshold 172, the controller 160 provides appropriate temperature control signals for operation of the cab cooling device 142 or the cab heating device 141, respectively.

The default maximum and minimum temperature thresholds 170, 172 are preset within the machine 100, typically as factory settings during manufacture. In at least one embodiment, however, the default maximum and minimum temperature thresholds 170, 172 may be preset by the user. Further, in at least one embodiment, default maximum and minimum temperature thresholds 170, 172 are preset within the machine 100, and the user may provide minimum and maximum temperature thresholds. That is, the default maximum and minimum temperature thresholds 170, 172 are preset within the machine 100, but the user may additionally provide one or both of a user input maximum temperature threshold 174 and a user input minimum temperature threshold 176 that may be used to override the preset default maximum and minimum temperature thresholds 170, 172.

In this way, the climate control system 154 may be tailored to environmental and/or user preferences. For example, although some embodiments may utilize both maximum and minimum temperature protection, some embodiments may utilize just maximum temperature protection, while other embodiments may utilize just minimum temperature protection.

According to another feature of the climate control system 154, the blower 145 associated with the cab 128 may be utilized to maintain a minimum airflow within the cab 128. That is, when the machine 100 is operating in an unmanned mode, the controller 160 may provide signals to operate the blower 145 at a minimum setting in order to maintain pressure and airflow within the cab 128.

INDUSTRIAL APPLICABILITY

The present disclosure is applicable to a machine 100 that may be remotely controlled, or utilized in autonomously or semi-autonomously operation.

Figure 3:
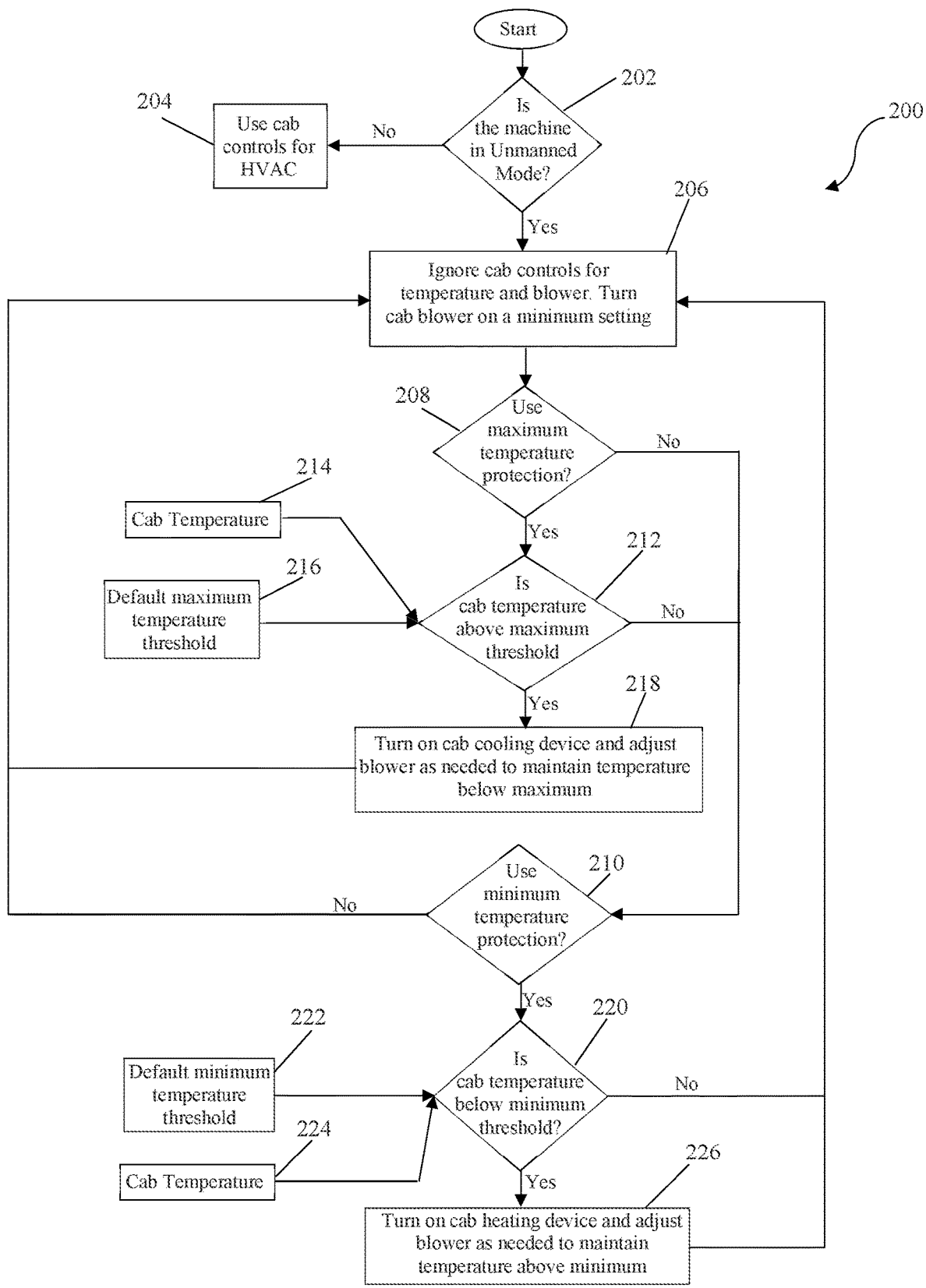
FIG. 3 is a flow chart of an exemplary control arrangement according to aspects of this disclosure.

Turning now to the flow chart of FIG. 3, there is illustrated an embodiment of an exemplary method 200 according to this disclosure. At panel 202, it is determined if the machine 100 is operating in an unmanned mode. If the machine is not operating in an unmanned mode, the operator uses the cab climate controls 138 to control the heating, ventilation, and cab cooling system (panel 204). Conversely, if the machine is operating in an unmanned mode, machine controls are generated at panel 206 to ignore any cab climate controls 138 for the temperature and the blower 145, and turn on the blower 145 for the cab 128 at a minimum setting.

With the machine operating in an unmanned mode, the controller then determines if maximum temperature protection is to be utilized (panel 208). If maximum temperature protection is to be utilized, the controller determines if the cab temperature is above the maximum threshold (panel 212). In determining if the if the cab temperature is above the maximum threshold, the controller 160 compares the cab temperature as determined by the temperature sensor 168 (panel 214) with the maximum threshold as set by the default maximum temperature threshold (panel 216). If the cab temperature is above the maximum threshold, machine control commands are generated at panel 218 to turn on the cab cooling device 142 and adjust the blower control 144 as needed to maintain the temperature below the maximum threshold.

If the cab temperature is not above the maximum threshold at panel 212, or if maximum temperature protection is not to be utilized at panel 208, the controller determines if minimum temperature protection is to be utilized (panel 210). If minimum temperature protection is not to be utilized, the method returns to panel 206 regarding control of the blower 145.

If, however, minimum temperature protection is to be utilized (panel 210), the controller determines if the cab temperature is below the minimum threshold (panel 220). In determining if the if the cab temperature is below the minimum threshold, the controller 160 compares the cab temperature as determined by the temperature sensor 168 (panel 224) with the minimum threshold as set by the default minimum temperature threshold (panel 222). If the cab temperature is below the minimum threshold (panel 220), machine control commands are generated at panel 226 to turn on the cab heating device 141 and adjust the blower control 144 as needed to maintain the temperature above the minimum threshold.

While FIG. 3 illustrates the method as first addressing maximum temperature protection, followed by minimum temperature protection, in at least one embodiment, the method first addresses minimum temperature protection, followed by maximum temperature protection. Similarly, in at least one embodiment, both maximum temperature protection and minimum temperature protection may be addressed substantially simultaneously, then proceeding with the applicable protection as determined by the controller 160.

Figure 4:
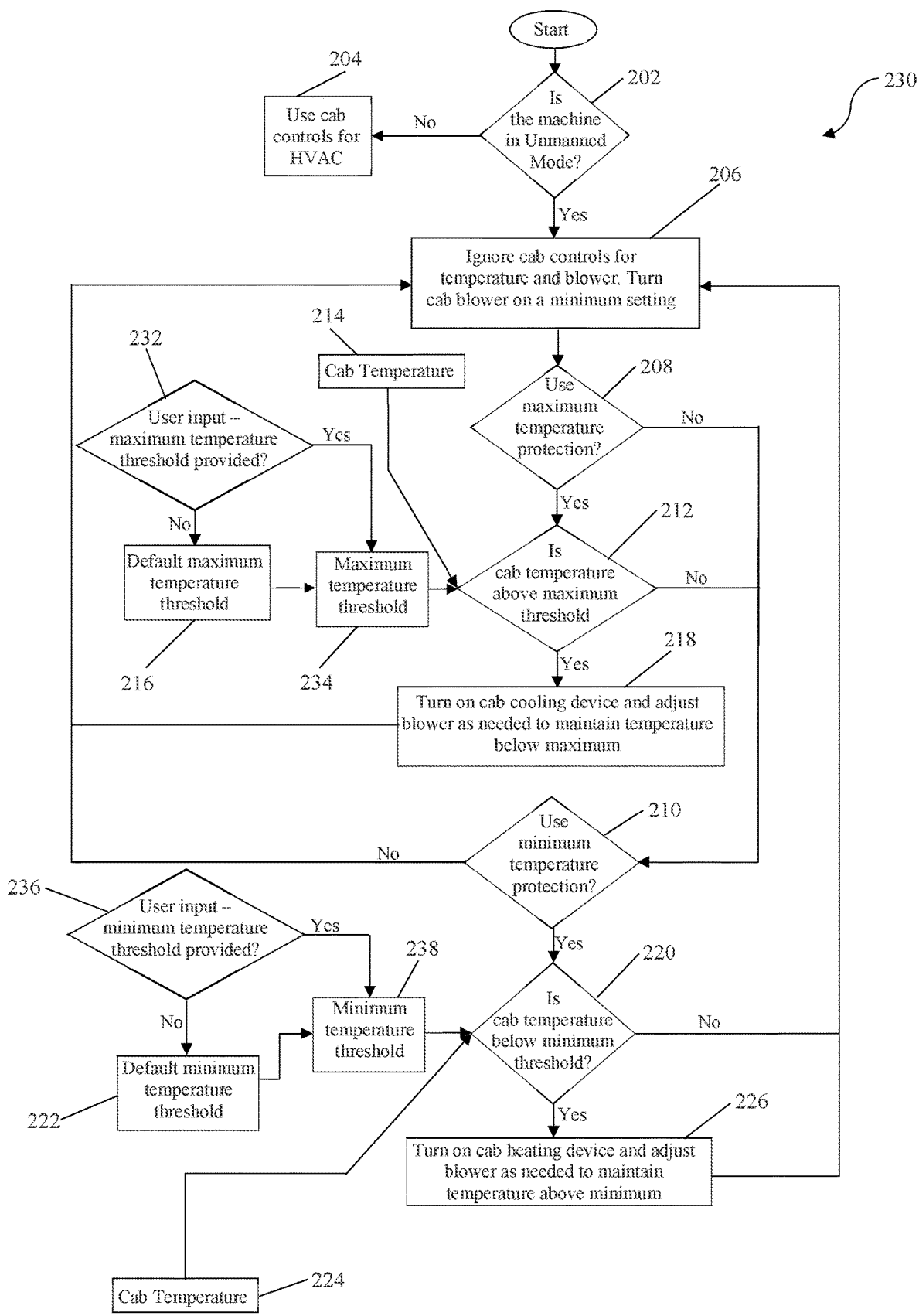
FIG. 4 is a flow chart of an alternative embodiment of an exemplary control arrangement according to aspects of this disclosure.

Turning now to the flow chart of FIG. 4, there is illustrated an embodiment of an exemplary method 230 that includes both default maximum and minimum temperature thresholds 170, 172, as well as user input maximum and minimum temperature thresholds 174, 176, such as discussed above with regard to FIG. 2. For the sake of clarity, the panels that are the same as those of FIG. 3 are given the same reference numbers. In this embodiment, however, the maximum and minimum temperature thresholds utilized at panels 212 and 220 are based upon user input.

More specifically, with regard to the application of maximum temperature protection, at panel 232, it is determined whether a user input maximum threshold 174 has been provided. If a user input maximum threshold 174 has been provided, it is set as the maximum temperature threshold at panel 234 for comparison to the cab temperature in panel 212. Conversely, if no user input maximum temperature threshold 174 has been provided (panel 232), then the default maximum temperature threshold 170 is set as the maximum temperature threshold at panel 234 for comparison to the cab temperature at panel 212.

Similarly, with regard to the application of minimum temperature protection, at panel 236, it is determined whether a user input minimum threshold 176 has been provided. If a user input minimum threshold 176 has been provided, it is set as the minimum temperature threshold at panel 238 for comparison to the cab temperature in panel 220. Conversely, if no user input minimum temperature threshold 176 has been provided (panel 236), then the default minimum temperature threshold 172 is set as the minimum temperature threshold at panel 238 for comparison to the cab temperature at panel 220.

The methods and systems of this disclosure may be applicable to machines used in unmanned operations, autonomous operation or remote control operation.

Some of the disclosed methods and systems according to this disclosure maybe useful to enhance cab cleanliness by maintaining pressurization of the cab 128 to reduce dust ingress.

Some of the disclosed methods and systems may be useful to and inhibit damage to internal components of the cab 128, while some embodiments may be useful to prolong the life of internal components of the cab 128 by maintaining the cab temperature in a safe range for the life of the internal components.

Some of the disclosed methods and systems may be useful in facilitating machines remaining consistently productive without regard to a human operator or environmental conditions. Some of the disclosed methods and systems may enhance production by assisting in reducing or minimizing downtime for maintenance or repair operations.

In addition, autonomous systems may permit operation in environments that are unsuitable or undesirable for a human operator. Autonomous or semi-autonomous systems may also compensate for inexperienced human operators as well as inefficiencies associated with repetitive tasks.

Some of the disclosed methods and systems may not require a separate control center in that the detection, analyses, and generation of control commands are performed by onboard equipment and software.

It will be apparent to those skilled in the art that various modifications and variations can be made to the climate control systems and procedures of the present disclosure. Other embodiments of the described methods and systems will be apparent to those skilled in the art from consideration of the disclosure herein. It is intended that the specification and examples of this disclosure be considered as exemplary only, with a true scope of the disclosure being indicated by the following claims and their equivalents. It is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system for controlling the climate of a cab of an autonomously operable machine when operated unmanned, the system comprising:
    at least one temperature sensor disposed and adapted to generate a signal indicative of a temperature within the cab; and
    a controller configured to:
        receive the signal indicative of the temperature within the cab;
        determine if the machine is being operated unmanned, and if the machine is being operated unmanned, then turn on a blower servicing the cab to a minimum setting;
        at least one of the following:
            determine if maximum temperature protection is requested;
                if maximum temperature protection is requested,
                compare the signal indicative of the temperature within the cab to a maximum temperature threshold,
                if the signal indicative of the temperature within the cab is greater than the maximum temperature threshold, then generate machine control commands to turn on cab cooling device, and generate machine control commands to adjust the blower as needed to maintain a temperature within the cab below the maximum temperature threshold; and
            determine if minimum temperature protection is requested;
                if minimum temperature protection is requested, compare the signal indicative of the temperature within the cab to a minimum temperature threshold,
if the signal indicative of the temperature within the cab is less than the minimum temperature threshold, then generate machine control commands to turn on cab heating device, and generate machine control commands to adjust the blower as needed to maintain a temperature within the cab above the minimum temperature threshold.

2. The system of claim 1, wherein at least one of the maximum temperature threshold is a default maximum temperature threshold, and the minimum temperature threshold is a default minimum temperature threshold.

3. The system of claim 2, wherein at least one of the maximum temperature threshold is a default maximum temperature threshold preset by a user, and the minimum temperature threshold is a default minimum temperature threshold preset by a user.

4. The system of claim 2, wherein at least one of the maximum temperature threshold is a default maximum temperature threshold preset during manufacture, and the minimum temperature threshold is a default minimum temperature threshold preset during manufacture.

5. The system of claim 1, wherein the maximum temperature threshold is a user input maximum temperature threshold if provided, and the maximum temperature threshold is a preset default maximum temperature threshold is the user input maximum temperature threshold is not provided.

6. The system of claim 1, wherein the minimum temperature threshold is a user input minimum temperature threshold if provided, and the minimum temperature threshold is a preset default minimum temperature threshold is the user input minimum temperature threshold is not provided.

7. An autonomously operable machine, comprising:
a cab;
a blower disposed and adapted to provide air to the cab;
at least one of
a cab heating device disposed and adapted to heat air provided to the cab by the blower, and
a cab cooling device disposed and adapted to cool air provided to the cab by the blower;
at least one temperature sensor disposed and adapted to generate a temperature signal indicative of a temperature within the cab;
a controller configured to:
receive the signal indicative of the temperature within the cab;
determine if the machine is being operated unmanned, and if the machine is being operated unmanned, then turn on the blower servicing the cab to a minimum setting;
at least one of the following:
determine if maximum temperature protection is requested;
if maximum temperature protection is requested,
compare the signal indicative of the temperature within the cab to a maximum temperature threshold,
if the signal indicative of the temperature within the cab is greater than the maximum temperature threshold, then generate machine control commands to turn on cab cooling device, and generate machine control commands to adjust the blower as needed to maintain a temperature within the cab below the maximum temperature threshold; and
determine if minimum temperature protection is requested;
if minimum temperature protection is requested,
compare the signal indicative of the temperature within the cab to a minimum temperature threshold,
if the signal indicative of the temperature within the cab is less than the minimum temperature threshold, then generate machine control commands to turn on cab heating device, and generate machine control commands to adjust the blower as needed to maintain a temperature within the cab above the minimum temperature threshold.

8. The machine of claim 7, wherein at least one of the maximum temperature threshold is a default maximum temperature threshold, and the minimum temperature threshold is a default minimum temperature threshold.

9. The machine of claim 7, wherein at least one of the default maximum temperature threshold and the default minimum temperature threshold is preset during manufacture.

10. The machine of claim 7, wherein the maximum temperature threshold is a user input maximum temperature threshold if provided, and the maximum temperature threshold is a preset default maximum temperature threshold if the user input maximum temperature threshold is not provided, and wherein the minimum temperature threshold is a user input minimum temperature threshold if provided, and the minimum temperature threshold is a preset default minimum temperature threshold if the user input minimum temperature threshold is not provided.

* * * * *